US008291153B2

(12) United States Patent
Berke et al.

(10) Patent No.: US 8,291,153 B2
(45) Date of Patent: Oct. 16, 2012

(54) TRANSPORTABLE CACHE MODULE FOR A HOST-BASED RAID CONTROLLER

(75) Inventors: Stuart Allen Berke, Austin, TX (US); Gary Benedict Kotzur, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 351 days.

(21) Appl. No.: 12/473,134

(22) Filed: May 27, 2009

(65) Prior Publication Data

US 2010/0306449 A1 Dec. 2, 2010

(51) Int. Cl.
G06F 12/08 (2006.01)
G06F 12/02 (2006.01)
G06F 12/16 (2006.01)
(52) U.S. Cl. . 711/103; 711/162; 711/114; 711/E12.103; 711/E12.008; 711/E12.019
(58) Field of Classification Search .................. None
See application file for complete search history.

(56) References Cited

U.S. PATENT DOCUMENTS

| 7,500,115 | B2 | 3/2009 | Berke et al. |
| 7,672,141 | B2 | 3/2010 | Middleton et al. |
| 2006/0212644 | A1* | 9/2006 | Acton et al. ................ 711/103 |
| 2010/0106904 | A1 | 4/2010 | Berke et al. |

* cited by examiner

Primary Examiner — Hoai V Ho
Assistant Examiner — James G Norman
(74) Attorney, Agent, or Firm — Baker Botts L.L.P.

(57) ABSTRACT

In accordance with the present disclosure, a system and method for an information handling system having transportable cache module is disclosed herein. The information handling system has a memory controller coupled to a central processing unit and a plurality of memory modules. The transportable cache module has a protected memory module, a nonvolatile memory module, a module controller, and an independent power source. The module controller is operative to copy a protected memory region from the protected memory module to a nonvolatile memory region on the nonvolatile memory module. The independent power source is operative to supply power to the protected memory module, the nonvolatile memory module, and the module controller.

20 Claims, 7 Drawing Sheets

TRANSPORTABLE CACHE MODULE FOR A HOST-BASED RAID CONTROLLER

TECHNICAL FIELD

The present disclosure relates generally to the operation of computer systems and information handling systems, and, more particularly, to a transportable cache module for a host-based RAID controller.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

Many information handling systems utilize a redundant array of independent disks (RAID) for data storage. Many RAID systems divide and replicate data among multiple storage devices, such as hard drives, or other memory modules, such as dual in-line memory modules (DIMMs). Using a RAID-type data storage, an information handling system can achieve higher performance, greater reliability, and hold larger data volumes. RAID controllers may run on an input/output processor, either as a standalone device or integrated within a RAID On Chip (ROC). Because information handling system processors are very fast at processing data and storage devices are relatively slow by comparison, one feature that is common on these controllers is a write-back cache. A write-back cache accelerates writes from the host by giving the host processor an acknowledgement very quickly and posting the write to the storage devices as storage device response allows. An acknowledgement tells the host processor that the write to the storage device is complete even before the actual write to the storage device is complete. In doing so, the RAID controller accepts responsibility for ensuring the data is protected until it can save the data to the storage devices. To protect the data on the memory module during the event of a power loss between the time of the acknowledgment and the time of the actual writing of data to the storage device, RAID controllers generally have a battery-backed memory module that guarantees that the data is protected for approximately 72 hours.

To allow performance saturated processors to regain overhead to be used for other applications, offload technologies, such as TCP Offload Engine and RAID, controllers were developed. However, today many information handling system processors have multiple cores and future information handling system processors will likely continue increasing the number of cores in the processors. Therefore, the industry is trying to find new ways to take advantage of this trend. One new technology involves moving the RAID engine back to the host processor. This is described as host-based RAID.

In moving the RAID engine back onto the host, to perform a write-back, the host memory needs to have nonvolatile memory used for the write-back cache. A problem with this is that memory modules on the host CPU are much larger than a ROC RAID card's memory module. Therefore, to supply a battery to the memory module would require a battery that can be up to 10 times larger than the ones used on a RAID card. That would add significant cost, power, and real-estate to the final solution.

SUMMARY

In accordance with the present disclosure, a system and method for an information handling system having transportable cache module is disclosed herein. The information handling system has a memory controller coupled to a central processing unit and a plurality of memory modules. The transportable cache module has a protected memory module, a nonvolatile memory module, a module controller, and an independent power source. The module controller is operative to copy a protected memory region from the protected memory module to a nonvolatile memory region on the nonvolatile memory module. The independent power source is operative to supply power to the protected memory module, the nonvolatile memory module, and the module controller.

A system and method for an information handling system having a transportable cache module that couples to two memory busses is disclosed. The information handling system has a primary memory bus and a secondary bus. The transportable cache module has a nonvolatile memory module, a module controller, and an independent power source. The transportable cache module is connected to a protected memory module through its connection to the secondary memory bus. The independent power source is operative to supply power to the protected memory module, the nonvolatile memory module, and the module controller.

A method for saving the contents of a cache to a transportable cache module is disclosed. Power is supplied to a protected memory module, a nonvolatile memory module, and a module controller by an independent power source. The module controller copies a protected memory region on the protected memory module to a nonvolatile memory region on the nonvolatile memory module. After the copy is made, the independent power source is turned off.

The system and method disclosed herein is technically advantageous because it reduces the size of the independent power source needed to protect the content in the RAID cache. Unlike systems of the current state of the art, which must supply power continuously to an entire memory module for the duration of the power or hardware failure, the independent power source used with the system disclosed herein merely has to supply enough power to the memory module and the rest of the transportable cache module for a time sufficient for the contents of the cache to be copied to the nonvolatile memory module. A second advantage of the disclosed system is that the cache module is transportable. If an information handling system fails, the cache and the storage devices can be moved to another information handling system. Once connected to the new information handling system, the RAID controller can flush any data still in the cache to the storage devices, thus preserving the integrity of the RAID array. A third advantage of the disclosed system is that it provides dedicated nonvolatile memory resources for the RAID controller. This eliminates the resource contention and security issues present in current state of the art information handling systems, where the information handling system's nonvolatile memory resources are shared between the RAID controller and other system components. A fourth advantage of the disclosed system is that it allows an information handling system to support multiple RAID controllers simultaneously. Current state of the art systems are not scalable to support multiple RAID controllers because additional independent power sources and nonvolatile memory resources must be added to the system. A fifth advantage of the system disclosed herein is that it helps minimize the costs of manufacturing information handling systems that support host-based RAID. Not all buyers of a particular type of information handling system will need host-based RAID functionality. However, systems of the current state of the art require the hardware components necessary to enable host-based RAID to be installed on every system. The system disclosed herein is advantageous because it allows for most of the additional hardware components to be installed by simply adding another separate module to an information handling system. This allows the manufacturer to only supply some of the components needed to support host-based RAID functionality to those buyers that need the functionality. A sixth advantage of the disclosed system is that the protected memory module may be an industry standard memory, such as a DIMM, of any capacity and speed supported by the system memory controller, either installed directly to the transportable cache module, or coupled to the transportable cache module. Supporting identical industry standard memory modules for the protected memory module as well as all of the other non-protected system memory modules is advantageous for cost, performance, and simplification of initialization, operation, and service. A seventh advantage of the disclosed system is that when a user does not require host-based RAID functionality, a standard memory module, such as a JEDEC DIMM, may be installed in place of the transportable cache module. In this case, the system memory topology and electrical channel characteristics are advantageously identical to systems that do not support host-based RAID with a transportable cache module. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
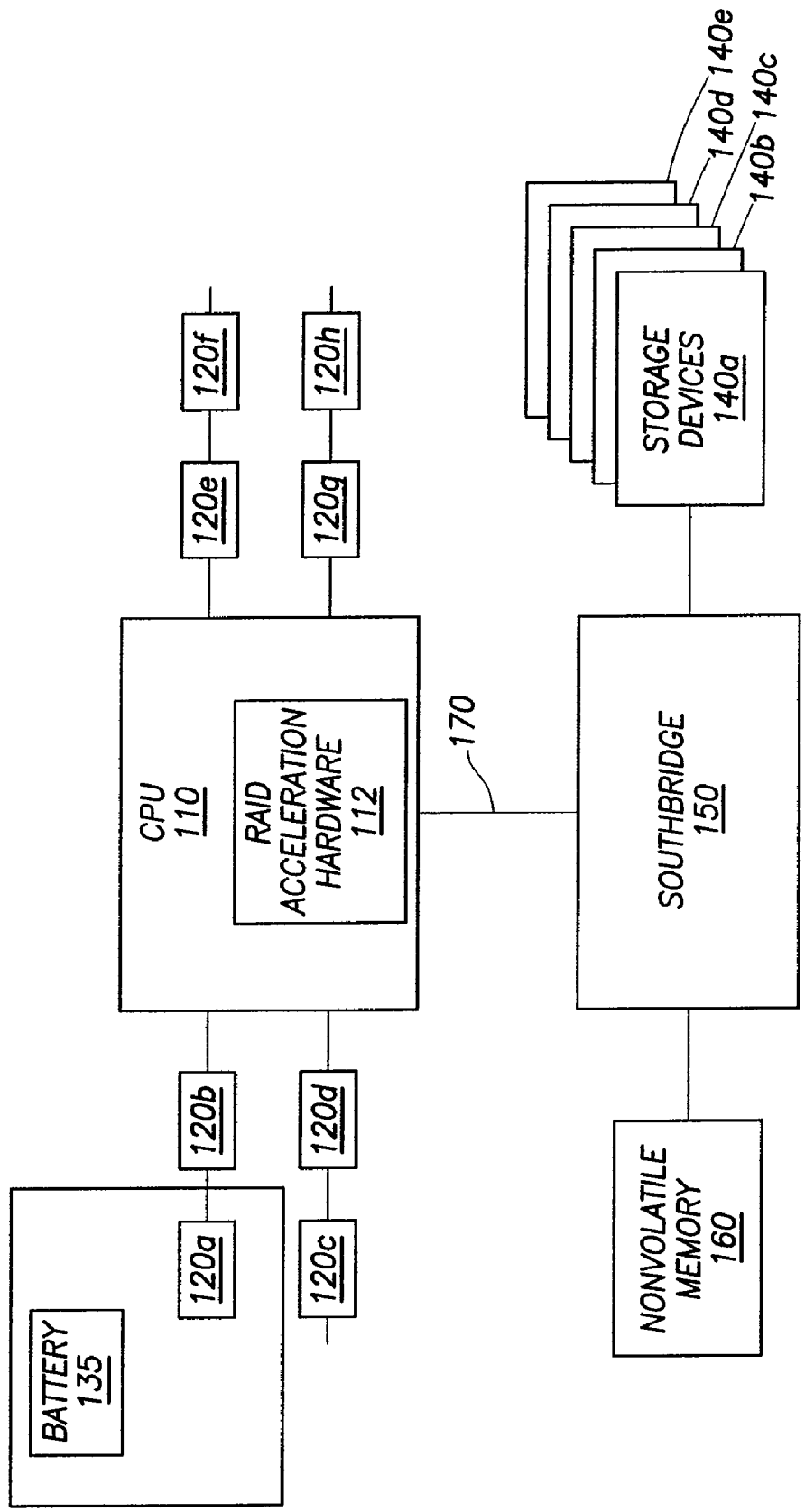
FIG. 1 illustrates an information handling system which implements host-based RAID according to the current state of the art.

Shown in FIG. 1 is an information handling system 100 that implements host-based RAID according to the current state of the art. A host-based RAID controller may be implemented in hardware, in software, or in software assisted by RAID acceleration hardware 112. The information handling system, which is generally referenced by numeral 100, comprises a central processing unit (CPU) 110. The CPU 110 may contain RAID acceleration hardware 112 which optimizes the handling of certain RAID tasks, such as calculating parity information. CPU 100 is coupled by way of a memory bus to a plurality of memory modules 120a-120h. The memory modules may be implemented using DDR DIMMs or other suitable memory technology. A southbridge 150 is coupled to the CPU 100 by way of a system bus 170. The system bus 170 may be implemented as a PCI Express bus. The information handling system further comprises storage devices 140a-140e. The storage devices may be connected to the southbridge using a variety of interfaces, such as Serial ATA (SATA) or Serial Attached SCSI (SAS). A nonvolatile memory (NVM) 160 is connected to the southbridge. A portion of the NVM is used to store firmware, configuration parameters, and logs needed for the information handling system's host-based RAID functionality.

A host-based RAID controller typically implements a write-back caching scheme. A region of a memory module is used to cache data and commands to be read or written to the storage devices that are a part of the RAID array. When a write command is received by the controller, the controller immediately sends an acknowledgement that the command was successfully processed back to the operation system. The acknowledgment is sent even though the controller has not yet executed the command. Instead, the command and its data will be stored in cache until the cache algorithm implemented by the RAID controller determines that the pending commands should be executed on, or "flushed" to, the storage devices.

In FIG. 1, a region of memory module 120a is used by the RAID controller to cache pending write commands and their accompanying data. Because the cache is being stored in volatile memory, the RAID array's data integrity may be compromised if there are pending write commands still present in the cache when the information handling system loses power, or suffers some other type of failure, before the pending write commands are flushed to the storage devices. To maintain the data integrity of the RAID array, it is necessary to preserve the contents of the cache until the RAID controller is able to flush the pending commands and data to the storage devices. For example, if the information handling system's primary power source is interrupted, the information handling system should have a mechanism to preserve the contents of the cache until power is restored. When the information handling system's primary power is restored, the RAID controller should flush the commands and data stored in the cache to the storage devices. The information handling system in FIG. 1 has a battery 135 connected to memory module 120a so that the memory module remains powered while the primary power is not available. As long as the battery supplies electricity to the memory module, the contents of the cache are preserved. When primary power is restored, the controller will flush the commands still in the cache to the storage devices.

Figure 2:
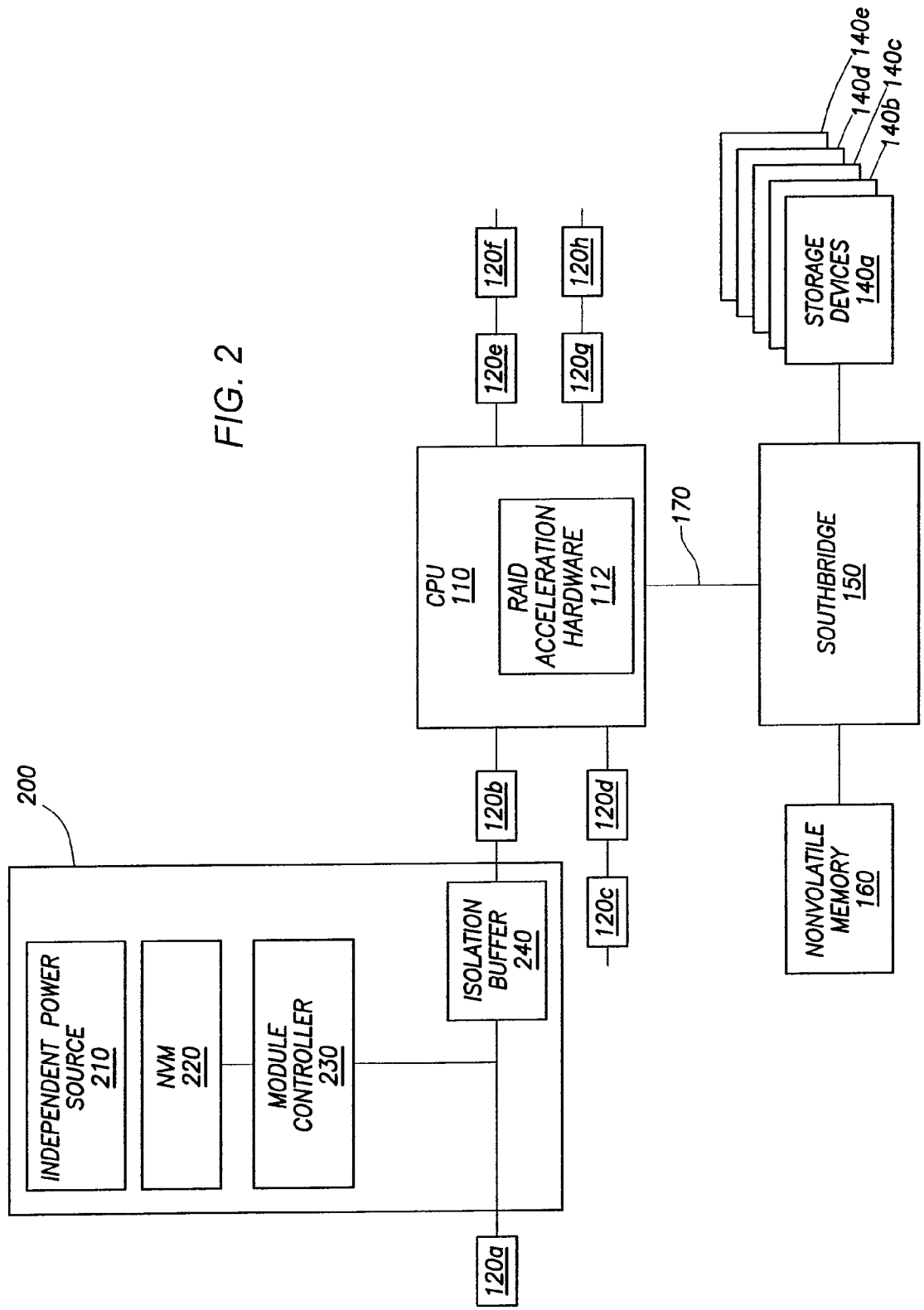
FIG. 2 illustrates one embodiment of an information handling system having a transportable cache module as disclosed herein.

FIG. 2 shows an embodiment of the system disclosed herein. Information handling system 100 has a transportable cache module 200. The transportable cache module has an independent power source 210, which may comprise a battery, a super capacitor, or other power source separate from the information handling system's primary power source. The transportable cache module 200 further comprises a nonvolatile memory (NVM) 220. The nonvolatile memory 220 may be flash memory or any other suitable memory technology. A module controller 230 is provided to copy data between the protected memory module 120a and the nonvolatile memory 220. The module controller 220 may also send and receive control signals to the information handling system, or engage or disable the isolation buffer 240. Isolation buffer 240 is provided to isolate the protected memory module from the other memory modules in the information handling system as necessary to maintain signal integrity.

Figure 3A:
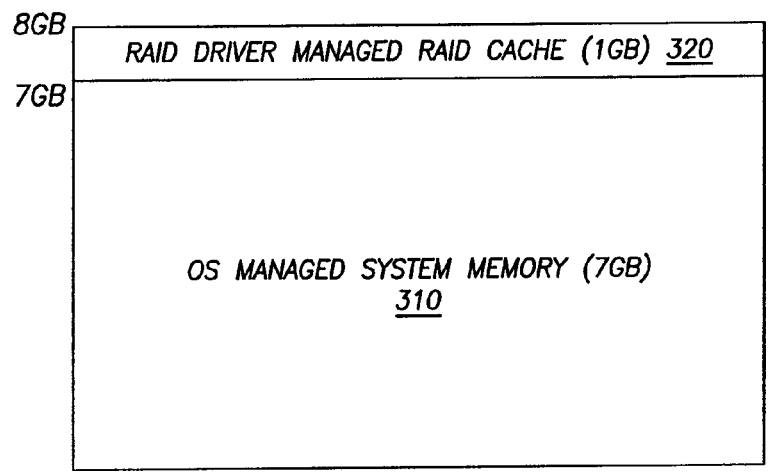
FIG. 3A shows the logical layout of an information handling system's main memory when host-based RAID is implemented according to the current state of the art.

FIG. 3A shows the layout of the main memory of an information handling system using a host-based RAID controller according to the current state of the art. In this example, there are eight gigabytes of total main memory. The seven gigabyte memory window 310 is operating system (OS) managed system memory. This memory window is fully accessible and visible to the operating system. A separate gigabyte memory window 320 is reserved for the host-based RAID controller. A special address range may be assigned to the reserved window 320. The RAID controller caches pending write commands in this memory window. The RAID Cache window 320 is typically mapped to a single memory module, which in turn is protected against power failure by an independent power source. The independent power source typically is designed to power the entire memory module for a reasonable period of time, usually 72 hours, to allow sufficient time for the system to be repaired or for power to be restored. If the system is repaired or power restored before the independent power source is fully depleted, then any pending write commands will be preserved and the data integrity of the RAID array is maintained.

Figure 3B:
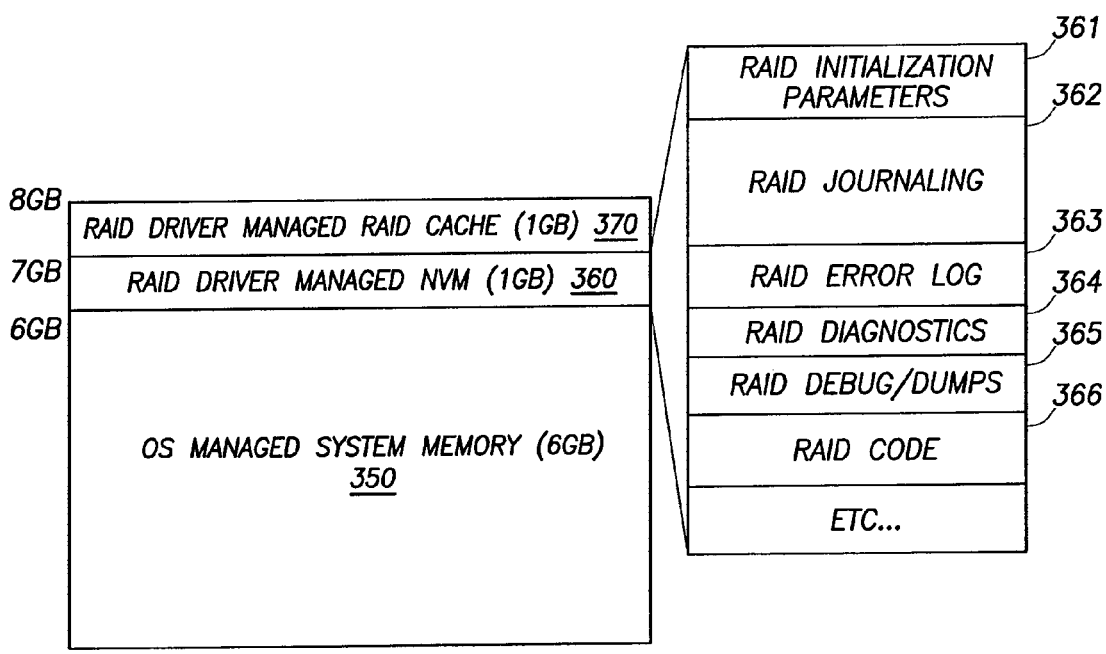
FIG. 3B shows the logical layout of an information handling system's main memory when host-based RAID is implemented as disclosed herein.

FIG. 3B shows the layout of the main memory of an information handling system using a host-based RAID controller as is disclosed herein. In this diagram, the information handling system has eight gigabytes of total main memory. A six gigabyte window 350 is used for OS managed system memory. A one gigabyte window 370 is used by the RAID controller for storing the cache. Another one gigabyte window 360 is used by the RAID controller to store RAID-related information that would be advantageous to store on a transportable and nonvolatile storage medium. Such information includes software code, such as RAID initialization parameters 361, the RAID journal 362, error log 363, RAID diagnostics 364, RAID debugging information and diagnostic dumps 365, or the code for the RAID controller 366. Memory windows 360 and 370 are mapped to a protected memory region on the protected memory module. Additional OS managed windows can be allocated within the protected memory region to store host system related information requiring fast access and high write endurance that would be advantageous to store on a nonvolatile storage medium.

Figure 4:
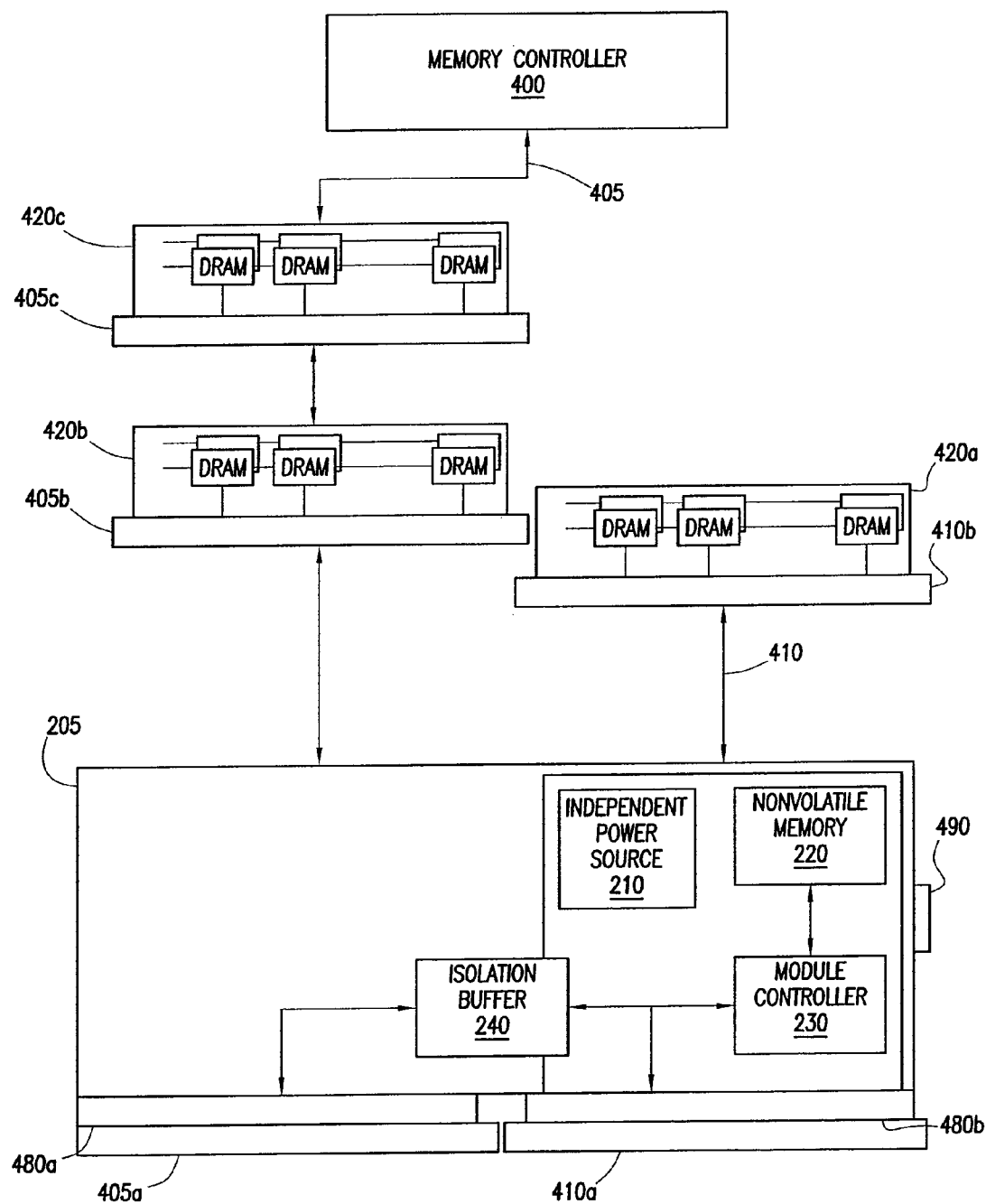
FIG. 4 illustrates an embodiment of the transportable cache module as disclosed herein where the transportable cache module couples with two memory busses.

FIG. 4 shows one embodiment of the transportable cache module disclosed herein. The information handling system has a memory controller 400. The memory controller is coupled to the primary bus 405. The primary bus has connection points 405a-405c for connecting memory modules or a transportable cache module. The primary bus, for example, can be implemented as a DDR channel. The connection points 405a-c can be any kind of connector for memory modules. For example, the connection points may accept a DDR DIMM module. There is also a secondary bus 410 which has connection points 410a-b.

If the system is not configured for host-assisted RAID, then connection points 405a-405c will typically be coupled to memory modules 420a-c, and connection points 410a-b are left unoccupied. In a system configured for host-assisted RAID, the connection points 405b-c may be coupled to memory modules 420b-c. A transportable cache module 205 having connection points 480a and 480b is coupled to connection points 405a and 410a respectively. Memory module 420a is coupled to connection point 410b. In this configuration, the memory module 420a is the protected memory module. The protected memory module may be of the same type of memory module, e.g. a JEDEC DIMM, as the other memory modules 420b-c. Transportable cache module 205 has an independent power source 210, which can be a battery, a super capacitor, or any other suitable power source. A nonvolatile memory module 220 is provided for safely storing the contents of the RAID cache when power to the memory modules is lost. A module controller 230 is provided for copying data between the nonvolatile memory module 220 and the protected memory module. The module may have an isolation buffer 240 to isolate the secondary bus 410 from the primary bus 405 when it is necessary for the module controller to copy data between the protected memory module and the nonvolatile memory module. The isolation buffer 240 is not required if signal integrity can be maintained without the use of an isolation buffer. Control signal connection 490 allows the transportable cache module to receive and send control signals to other parts of the information system. For example, a control signal from the information handling system may indicate that the main power supply is transitioning to the off or on state, or a signal may indicate that the memory bus is about to be initialized. The module may send a signal to the information handling system to force the system to pause or resume the memory bus initialization routine. The control signal connection 490 is not necessary if the control signals can be sent and received through module connection 480a or 480b.

Figure 5:
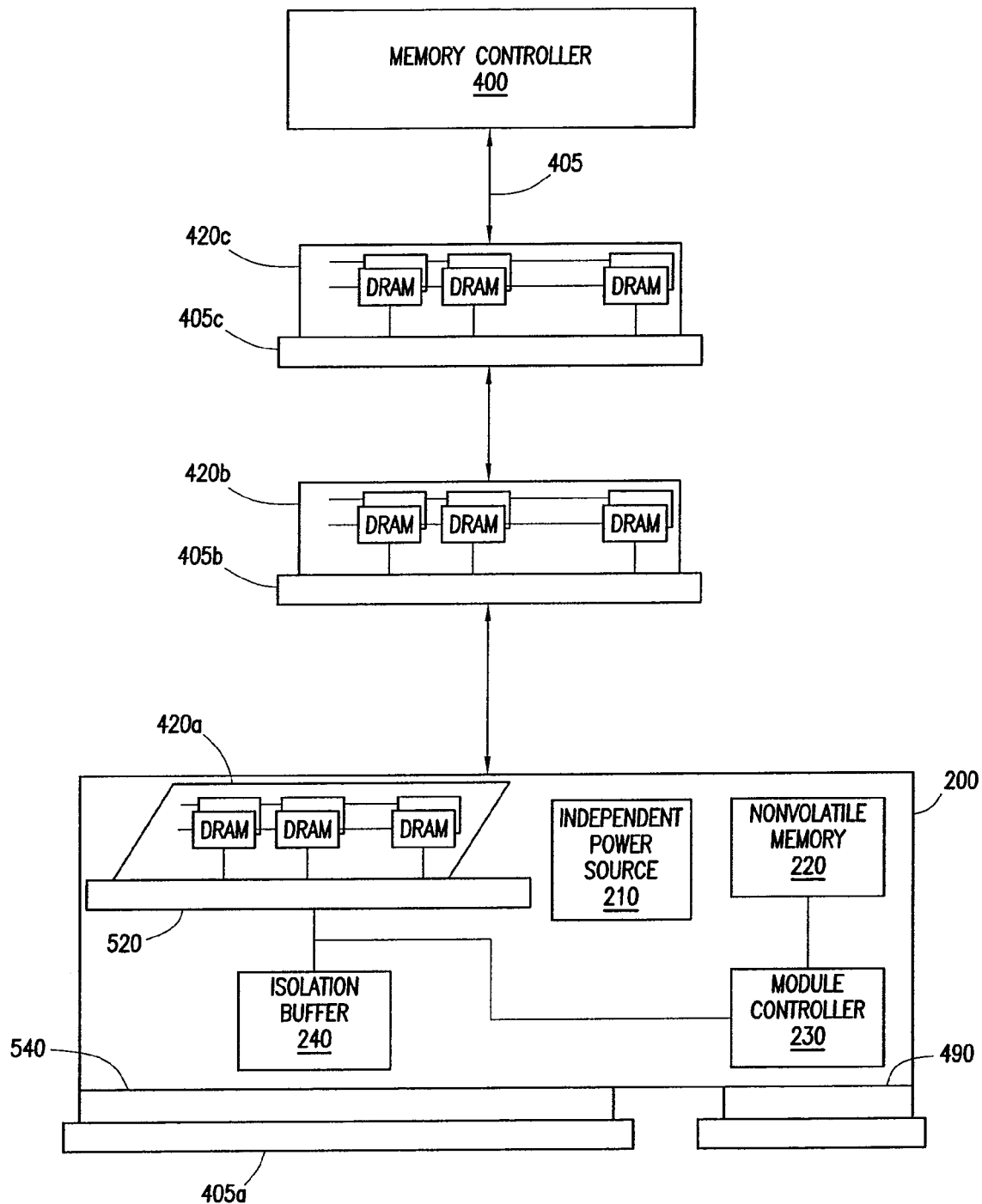
FIG. 5 illustrates an embodiment of the transportable cache module as disclosed herein where the transportable cache module only couples with one memory bus.

FIG. 5 shows another embodiment of the transportable cache module where the module is in the form of a riser module. The transportable cache module 200 has an independent power source 210, which can be a battery, a super capacitor, or any other suitable power source. A nonvolatile memory module 220 is provided for safely storing the contents of the RAID cache when power to the memory modules is lost. A module controller 230 is provided for copying data between the nonvolatile memory module 220 and the memory module 420a. A memory module 420a couples to the memory module connection 520. The connection 520 may accept a DDR DIMM memory module or some other kind of memory. The memory module may be the same type of memory module as is used for memory modules 420b-c. Memory module 420a is the protected memory module in this configuration. Module connection 540 couples the module 200 to connection point 405a of primary bus 405. The module connection 540 may use a standard DDR DIMM connector. The transportable cache module 200 may have an isolation buffer 240 to provide a buffered connection between the protected memory module and the primary bus 405. The isolation buffer is not required if signal integrity can be maintained without the use of the isolation buffer. Transportable cache module 200 also has a control signal connection 490 to receive and send control signals to other parts of the information system. The control signal connection 490 is not necessary if the control signals can be sent and received through the module connection 540. In an information handling system that supports this embodiment of the transportable cache module, any of the connection points 405a-c may hold a transportable cache module or a memory module. If host-based RAID is not enabled on the system, then all of the connection points may be coupled to memory modules or left uncoupled.

Figure 6A:
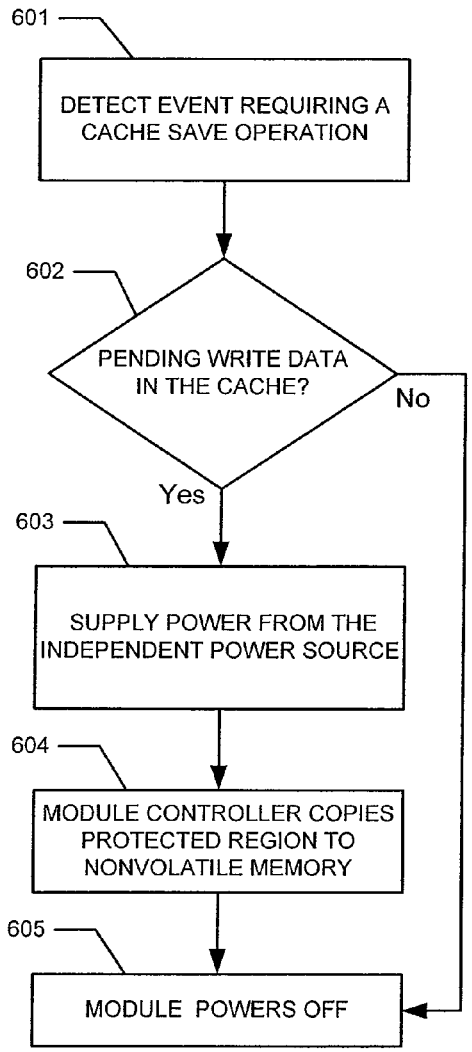
FIG. 6A is a flow diagram depicting the method steps an embodiment of the system disclosed herein may follow when the information handling system loses power or suffers some other failure.

The operation of the system disclosed herein will be explained with reference to FIGS. 6A, 6B and 7. FIG. 6A is a flow diagram depicting the method steps an embodiment of the system disclosed herein may follow when the information handling system loses power or suffers some other failure. At 601, the system detects an event that may require a cache save operation. The transportable cache module may receive a control signal indicating that the information handling system's power source is transitioning to an off state, or that there is some other system failure that may endanger the contents of the RAID cache while it is stored in a volatile memory module. At 602, the cache module may check the cache table to determine whether there are any pending write commands and data present in the cache. If there are no pending write commands and associated data, then the contents of the cache do not need to be preserved, and the transportable cache module powers off the independent power source if the module is drawing power from it. If there are pending write commands and associated data, the transportable cache module will begin using the independent power source to provide power to its components. If an isolation buffer is present, the module will isolate the protected memory module from the other memory modules. At 604, the module controller copies the contents of the protected region in the protected memory module to the nonvolatile memory region in the nonvolatile memory module. When the controller finishes copying the protected region, the independent power source is powered off.

Figure 6B:
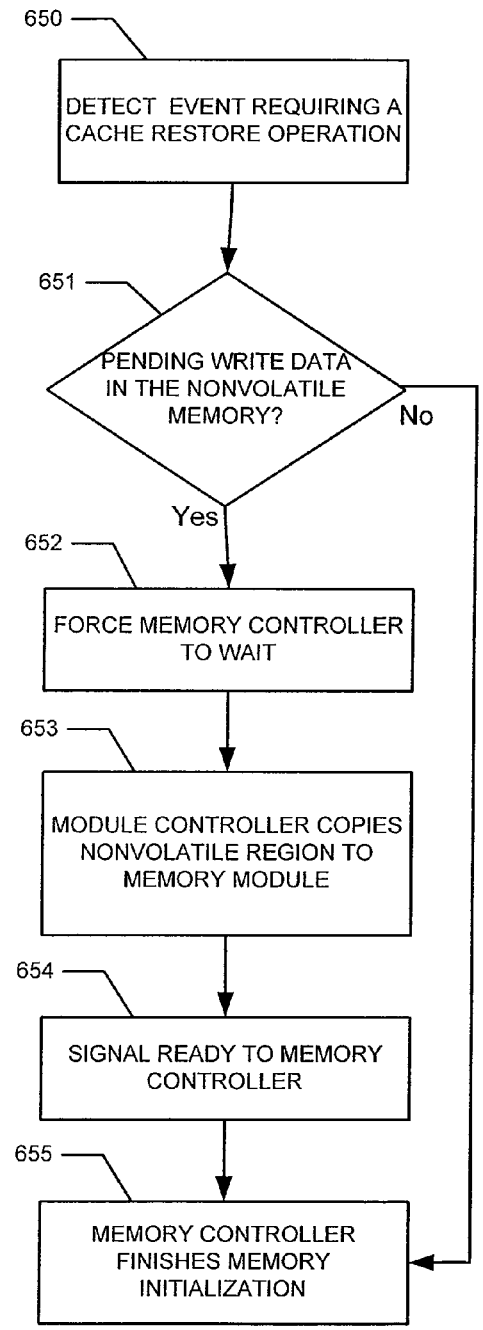
FIG. 6B is a flow diagram depicting the method steps an embodiment of the system disclosed herein may follow when the information handling system is restored.

FIG. 6B is a flow diagram depicting the method steps an embodiment of the system disclosed herein may follow when the information handling system is restored. At 650, the system detects an event that may require a cache restore operation. The transportable cache module may receive a control signal indicating that the information handling system's power source is transitioning to an on state, or that the memory controller is attempting to initialize the memory bus. At 651, the cache module may check the nonvolatile memory to determine whether there are any saved pending write commands and associated data that needs to be restored to the cache. If there are no pending write commands, then the transportable cache module may send a control signal indicating that the information handling system or memory controller may continue initializing the system. If the protected memory module is isolated by the isolation buffer, the buffer may be deactivated before the transportable cache module sends the control signal. If there are pending write commands, the transportable cache module will force the information handling system or memory controller to wait at step 652. For example, this may be accomplished by sending a control signal that pauses the memory initialization routine. The module controller will then copy the nonvolatile region in the nonvolatile memory module to the protected region in the protected memory module. At 654, the transportable cache module sends a control signal indicating that the information handling system or memory controller may continue initializing the system. If there is an isolation buffer, the transportable cache module may disable it before sending the control signal. At some point, the RAID controller will flush the preserved write commands and data to the storage devices in accordance with the cache algorithm that is implemented by the RAID driver.

Figure 7:
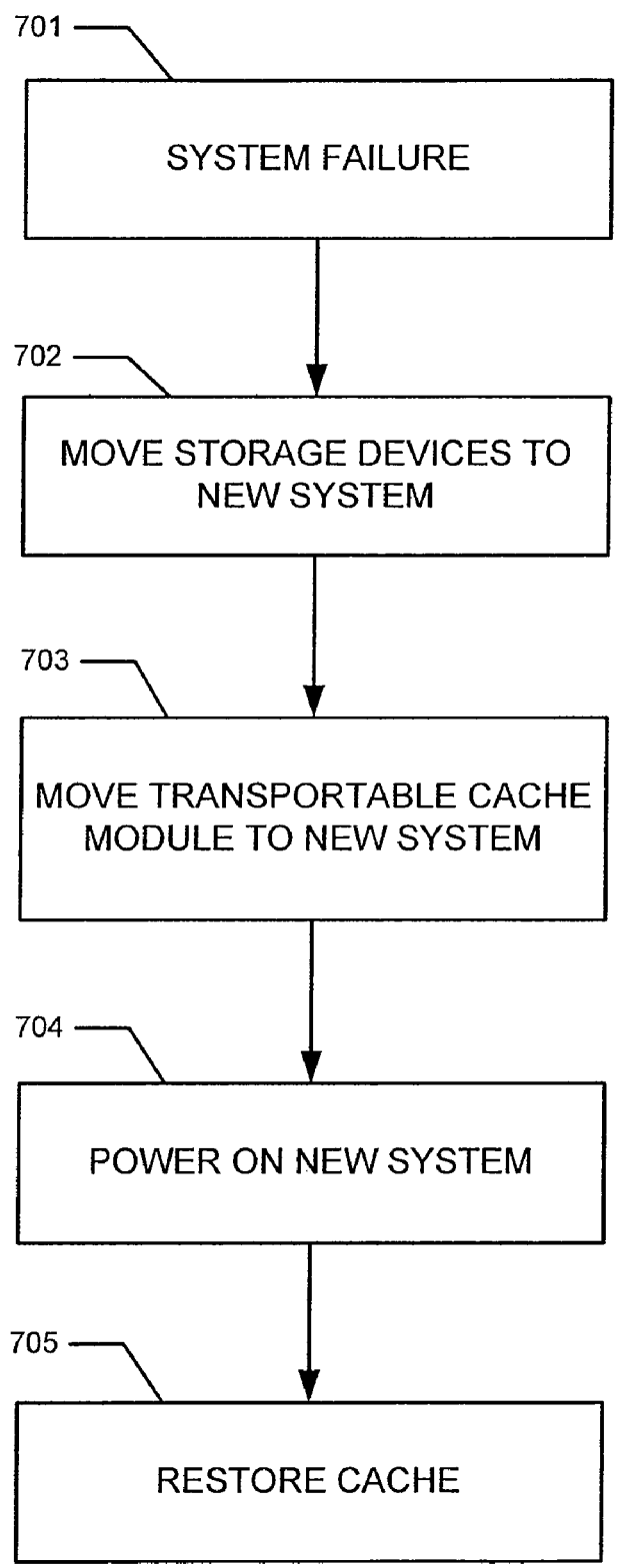
FIG. 7 is a flow diagram depicting how the transportable cache module disclosed herein may be moved from a first information handling system to a second information handling system.

FIG. 7 is a flow diagram depicting how the transportable cache module disclosed herein may be moved from a first information handling system to a second information handling system. At 701, the first information handling system containing the transportable cache module may be powered off or otherwise fail. As previously discussed, the system disclosed herein will preserve the contents of the RAID cache to the nonvolatile memory module in the transportable cache module. At 702, the transportable cache module is moved from the first information handling system to the second information handling system. The storage devices associated with the RAID array in the first information handling system are also moved to the second information handling system. At 704, the second information handling system is powered on. At 705, the system will detect whether a cache restore operation is necessary, and if there are pending write commands and data, those commands will be restored to the RAID cache. The RAID controller may then flush the pending commands to the storage devices.

Although the present disclosure has been described in detail, it should be understood that various changes, substitutions, and alterations can be made hereto without departing from the spirit and the scope of the invention as defined by the appended claims.

What is claimed is:

1. An information handling system comprising:
   a memory controller coupled to a central processing unit;
   a plurality of memory modules comprising at least one unprotected memory module, wherein the memory modules are volatile memory modules;

a memory bus coupling the plurality of memory modules to the memory controller;
a transportable cache module coupled to the memory bus, the transportable cache module comprising:
  a protected memory module;
  a nonvolatile memory module;
  a module controller, wherein the module controller is operative to copy a protected region of memory from the protected memory module to a nonvolatile region of memory on the nonvolatile memory module; and
  an independent power source, wherein the independent power source is operative to supply power to the protected memory module, the nonvolatile memory module and the module controller; and
a host-based storage controller operable to cache data to a protected memory module for a storage device.

2. The information handling system of claim 1, wherein the transportable cache module further comprises an isolation buffer.

3. The information handling system of claim 2, wherein the independent power source is selected from the group consisting of a battery and a super capacitor.

4. The information handling system of claim 2, wherein the protected memory module and the plurality of memory modules are of the same type.

5. The information handling system of claim 3, wherein the nonvolatile memory module comprises a flash memory module.

6. The information handling system of claim 2, wherein the transportable cache module further comprises a control signal connection.

7. The information handling system of claim 6, wherein the memory bus comprises a DDR memory bus.

8. The information handling system of claim 1, wherein the transportable cache module further comprises a control signal connection.

9. A transportable cache module comprising:
  a primary connection coupled to a primary memory bus, wherein the primary memory bus is coupled to a plurality of volatile memory modules;
  a secondary connection coupled to a secondary memory bus, wherein the secondary memory bus is coupled to a protected memory module;
  a nonvolatile memory module;
  a module controller, wherein the module controller is operative to copy a protected region of memory from the protected memory module to a nonvolatile region of memory on the nonvolatile memory module;
an independent power source, wherein the independent power source is operative to supply power to the protected memory module, the nonvolatile memory module and the module controller;
  wherein the transportable cache module is configured to permit a host-based storage controller to cache data to the protected memory module for a storage device.

10. The transportable cache module of claim 9, wherein the transportable cache module further comprises an isolation buffer.

11. The transportable cache module of claim 10, wherein the independent power source is selected from the group consisting of a battery and a super capacitor.

12. The transportable cache module of claim 11, wherein the memory busses accept memory modules of the same type.

13. The transportable cache module of claim 9, wherein the transportable cache module further comprises a control signal connection.

14. The transportable cache module of claim 10, wherein the transportable cache module further comprises a control signal connection.

15. A method for saving the contents of a cache to a transportable cache module comprising:
  caching data for a data storage device to a protected memory module by a host-based storage controller
  supplying power to the protected memory module, a nonvolatile memory module, and a module controller, wherein the power is supplied by an independent power source;
  isolating the protected memory module from a plurality of unprotected memory modules, wherein the plurality of unprotected memory modules are volatile memory modules;
  copying a protected memory region on the protected memory module to a nonvolatile memory region on the nonvolatile memory module, wherein the copying is performed by the module controller; and
  powering off the independent power source after the protected memory region has been copied to the nonvolatile memory region.

16. The method for saving the contents of a cache to a transportable cache module of claim 15, wherein the protected memory module is isolated by a DDR isolation buffer.

17. The method for saving the contents of a cache to a transportable cache module of claim 15, wherein the independent power source is selected from the group consisting of a battery and a super capacitor.

18. The method for saving the contents of a cache to a transportable cache module of claim 15, wherein the nonvolatile memory module comprises a flash memory module.

19. The information handling system of claim 1 comprising:
  a first memory window residing on the protected memory module, wherein the first memory window is reserved to a host-based RAID controller; and
  a second memory window residing on the protected memory module, wherein the second memory window is managed by an operating system.

20. The information handling system of claim 19, wherein the first memory window further comprises a RAID Cache, RAID-related information, or both.

* * * * *